United States Patent [19]
Hammond et al.

[11] Patent Number: 5,214,760
[45] Date of Patent: May 25, 1993

[54] ADAPTABLE MULTIPLE PORT DATA BUFFER

[75] Inventors: John A. Hammond, Portland, Oreg.; Thomas M. Cooper, Vancouver, Wash.

[73] Assignee: Tektronix, Inc., Wilsonville, Oreg.

[21] Appl. No.: 237,922

[22] Filed: Aug. 26, 1988

[51] Int. Cl.$^5$ .............. G06F 13/14; G06F 13/38; G06F 15/20

[52] U.S. Cl. .............. 395/250; 364/239; 364/240.8; 364/242.5; 364/284; 364/DIG. 1; 395/325; 395/500

[58] Field of Search ........ 364/468, 478, 200 MS File, 364/900 MS File, 521; 379/88, 269; 370/94.1, 58.3; 358/84, 355; 371/51.1; 395/200, 500, 325, 250

[56] References Cited

U.S. PATENT DOCUMENTS

| | | | |
|---|---|---|---|
| 3,618,037 | 11/1971 | Wollum et al. | 395/250 |
| 4,281,315 | 7/1981 | Bauer et al. | 364/200 |
| 4,292,669 | 9/1981 | Wollum | 395/266 |
| 4,377,843 | 3/1983 | Garringer et al. | 364/200 |
| 4,387,425 | 6/1983 | El-Gohary | 364/200 |
| 4,435,763 | 3/1984 | Bellay et al. | 364/200 |
| 4,470,113 | 9/1984 | Oura | 364/200 |
| 4,628,446 | 12/1986 | Hoffner, II | 364/900 |
| 4,630,232 | 12/1986 | Loskorn et al. | 364/900 |
| 4,688,170 | 8/1987 | Waite et al. | 364/200 |
| 4,817,177 | 3/1989 | Shimizu | 370/94.1 |
| 4,833,673 | 5/1989 | Chao et al. | 370/94.1 |
| 4,837,677 | 6/1989 | Burrus, Jr. et al. | 364/200 |
| 4,875,208 | 10/1989 | Furuhashi et al. | 370/94.1 |
| 4,876,681 | 10/1989 | Hagiwara et al. | 370/94.1 |
| 4,878,218 | 10/1989 | Takada | 370/94.1 |
| 4,885,632 | 12/1989 | Mabey et al. | 358/84 |
| 4,899,306 | 1/1990 | Greer | 364/900 |
| 4,965,825 | 10/1990 | Harvey et al. | 364/521 |
| 4,967,340 | 10/1990 | Dawes | 364/200 |
| 4,967,415 | 10/1990 | Tanagawa: Kouzi | 371/51.1 |

OTHER PUBLICATIONS

"High Integration LSI for Low Cost Asynchronous Communications" Yeager, et al. 8079 IEEE Electro, vol. 7 (1982) May, New York USA.

"A Universal Process Control Interface" Tavora, et al IEEE 1980 IECI Proceedings, Philadelphia, PA Mar. 17-20, 1980.

Primary Examiner—Thomas C. Lee
Assistant Examiner—Ayni Mohamed
Attorney, Agent, or Firm—Daniel J. Bedell; Francis I. Gray

[57] ABSTRACT

A data buffer includes parallel and serial data ports connected to one or more equipment modules that produce output data or respond to input commands. The data buffer also includes a serial control port communicating with a host computer. The data buffer receives and stores output data from the equipment modules via the data ports. The buffer configures each data port to match the data transfer protocol (baud rate, parity checking etc.) of the equipment module to which it is connected in response to input commands transmitted from the host computer via the control port. The host computer may also command the buffer to immediately route incoming data on one data port outward on one or more other selected data or control ports or to store incoming data for later transmission via a selected port in response to an input command. The host computer may additionally command the buffer to periodically transmit a stored data string outward on one or more designated data ports. The data buffer also includes a real time clock producing data indicating current time and date. When the data buffer detects a state change in an input bit at a parallel port, it generates an indicating message including the bit state along with the current time and date and forwards the message to the host computer.

13 Claims, 8 Drawing Sheets

ADAPTABLE MULTIPLE PORT DATA BUFFER

BACKGROUND OF THE INVENTION

The present invention relates in general to data buffers and in particular to a multiple port data buffer configurable by externally generated commands for interfacing a host computer to equipment modules using various types of input and output ports and data communication protocols.

in a telephone network, equipment modules such as telephone and data switches, voice and data multiplexers and carrier equipment typically include one or more serial RS-232 ports. These ports provide outputs for alarm, status or statistical reporting or provide inputs for equipment configuration commands and data. Unfortunately the RS-232 standard allows variation in port configuration wherein ports of various telephone equipment modules employ differing word sizes, baud rates, error checking schemes, data flow control codes, etc. In addition, some equipment modules are controlled by parallel input signals and generate binary output signals for alarm or status reporting. While it is desirable to centralize the tasks of monitoring and controlling the various equipment modules in a single host computer, variation in module input/output configuration complicates the task of interfacing the host computer to the various equipment modules.

Centralization is further complicated in that alarm and statistical data output of many equipment modules must be captured at the port output. When generated or it is lost. Therefore, a centralized host computer acquiring alarm data from many equipment modules must poll all the maintenance ports quickly to avoid missing alarm data. While a high speed host computer may be capable of polling equipment modules rapidly enough, such a host computer is usually large and expensive.

SUMMARY OF THE INVENTION in accordance with one aspect of the invention, a multiple port data buffer includes parallel and serial data ports connected to one or more equipment modules and a serial control port connected to a host computer. The preferred embodiment of the invention includes a second serial control port that may be connected to a local display terminal. The data buffer receives and stores output data from the equipment modules via the data ports, and then transmits the stored input data to the host computer or local terminal via control ports selectively either as received or in response to commands from the host computer or local terminal. Since the buffer stores output data from the equipment modules as the data is produced, the host computer need not rapidly poll the various equipment modules to avoid missing the output data.

In accordance with another aspect of the invention, the buffer adjusts the configuration of each data port to match the configuration of the equipment module to which it is connected. The port makes such adjustments in response to input commands from the host computer or local computer transmitted via the control port.

In accordance with a further aspect of the invention, commands transmitted to the buffer via the control port also configure the buffer to selectively route incoming data or one data port outward on one or more other data or control ports or to store incoming data for later transmission via a selected port in response to an input command. Thus the buffer may, for example, store output data of one or more equipment modules connected to the data buffer until the host computer wants to acquire it or to forward the input data to a printer or other devices via another Port at the same time it is forwarded to the host computer or local terminal.

In accordance with a still further aspect of the invention, commands transmitted to the buffer via either control port configure the buffer to store a data string and to subsequently transmit the data string outward on one or more designated data ports in response to another input command via a control port. The data string may, for example, be a command understood by an equipment module causing the equipment module to transmit status data via the serial port.

In accordance with yet another aspect of the invention, a command transmitted to the data buffer via either control port configures the buffer to periodically transmit a stored data string outward on one or more designated data ports. Thus, for example, without further intervention by the host computer, the data buffer may periodically command an equipment module to transmit status data via the serial port, and the buffer may route that status data to the host computer or local terminal.

In accordance with still another aspect of the invention, the data buffer includes a real time clock producing data indicating current time and date. When the data buffer a state change in an input bit at a parallel port, it generates an indicating message including the bit state along with the current time and date and transmits the message output on a selected control port.

It is accordingly an object of the invention to provide an apparatus for interfacing variously configured serial and data ports of various equipment modules to a host computer.

The subject matter of the present invention is particularly pointed out and distinctly claimed in the concluding portion of this specification. However, both the organization and method of operation of the invention, together With further advantages and objects thereof, may best be understood by reference to the following description taken with the accompanying drawings wherein like reference characters refer to like elements.

DESCRIPTION OF THE PREFERRED EMBODIMENT(S)

Figure 1:
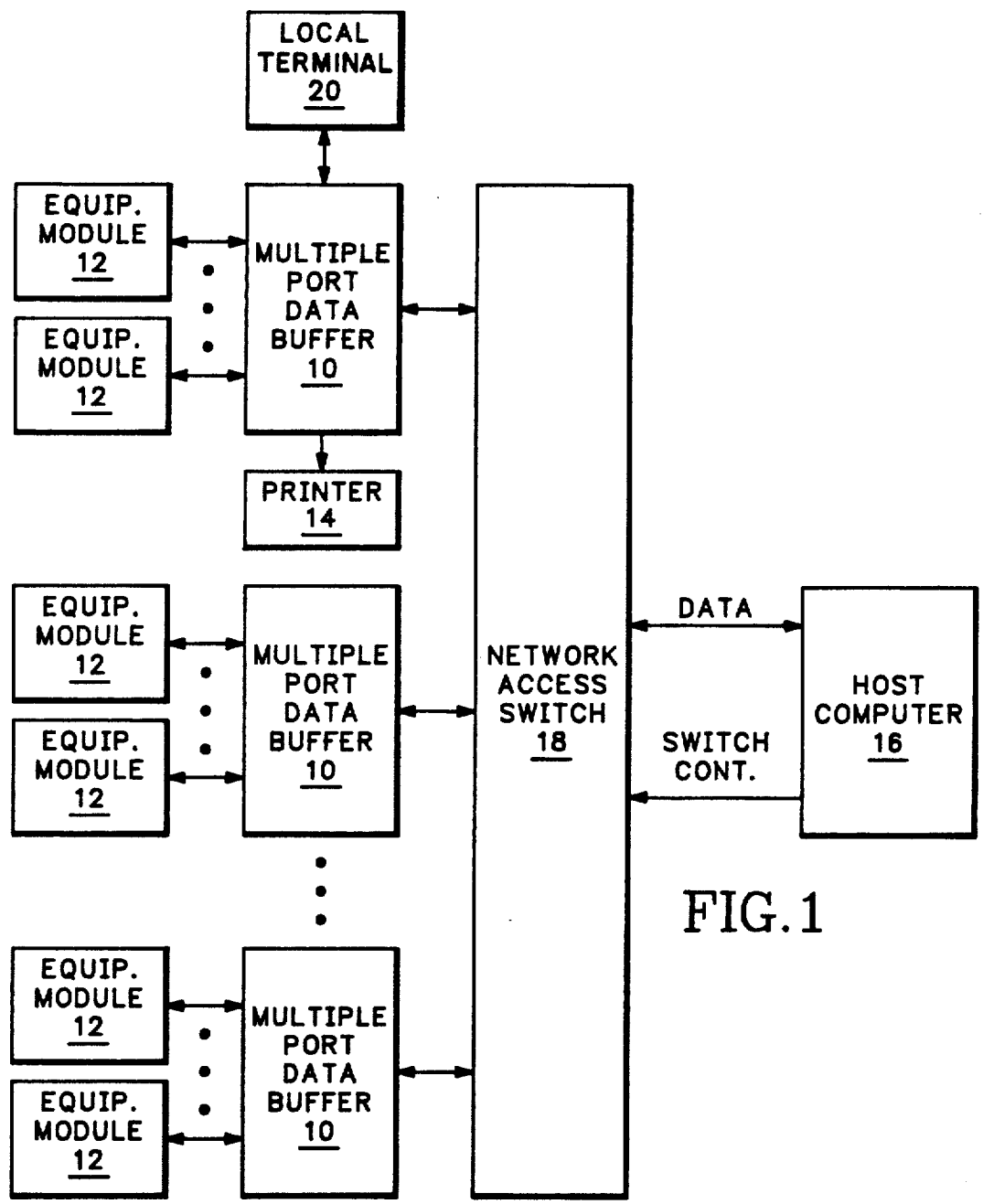
FIG. 1 is a block diagram of a data acquisition and control system utilizing the multiple port data buffer of the present invention.

FIG. 1 is a block diagram of a data acquisition and control system employing a set of data buffers 10 in accordance with the present invention. Each data buffer 10 includes six parallel and six RS-232 serial "data" ports, each of which may be connected to a similar port in an equipment module 12 or to a printer 14. Each data buffer also includes two RS-232 serial "control" ports, one connected to a host computer 16 through a network access switch 18 and one that may be connected to a local terminal 20. Host computer 16 controls network access switch 18 to selectively connect a serial port of the host computer to the serial control port of any one data buffer 10. The equipment modules may, for example, be various network devices in a telephone central switching office such as switches, modems and the like.

Each data buffer 10 receives and stores output data from an equipment module 12 via a serial or parallel data port, and then selectively transmits the stored input data to the host computer 16 or to the local terminal 20, to a printer 14 or another network device to which it is connected.

As discussed in detail herein below, the host computer 16 or a user operating a local terminal 20 may transmit input commands to the data buffer 10 via either of its control ports. For example, some of these commands tell the buffer how to route incoming data. Other commands tell the buffer how to adjust configuration of each data port to match the configuration of a port in the equipment module 12 or printer 14 to which it is connected and how to appropriately format and interpret data transmissions when communicating with the equipment modules or printer.

Figure 2:
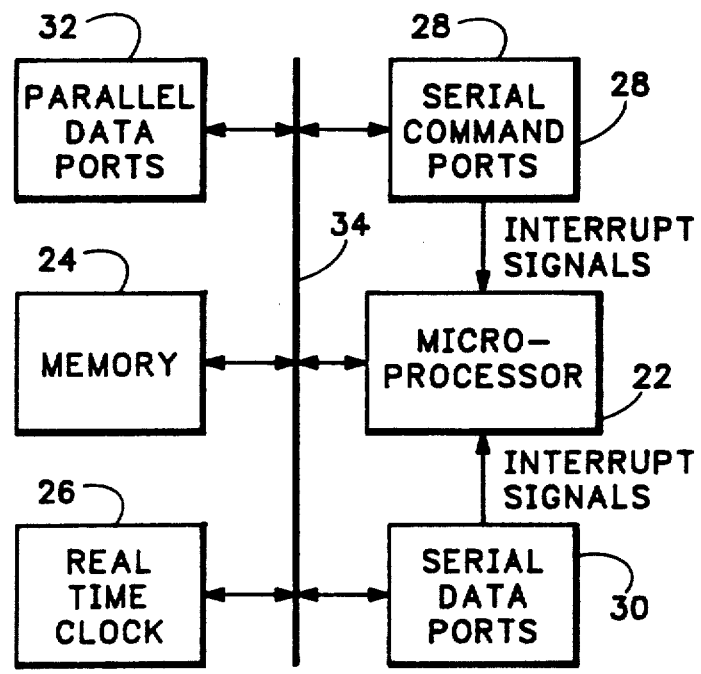
FIG. 2 is a hardware block diagram of the multiple buffer of the present invention.

FIG. 2 is a hardware block diagram of a single data buffer 10 of FIG. 1. Buffer 10 includes a conventional eight-bit microprocessor 22, random access and read only memory 24, a conventional real time clock circuit 26 producing current date and time data, two RS-232 serial command ports 28, six RS-232 serial data ports 30 and six parallel data ports 32, all interconnected by a computer bus 34. Each parallel data port 32 can selectively receive up to eight binary input signals or produce up to eight binary output signals.

Figure 3:
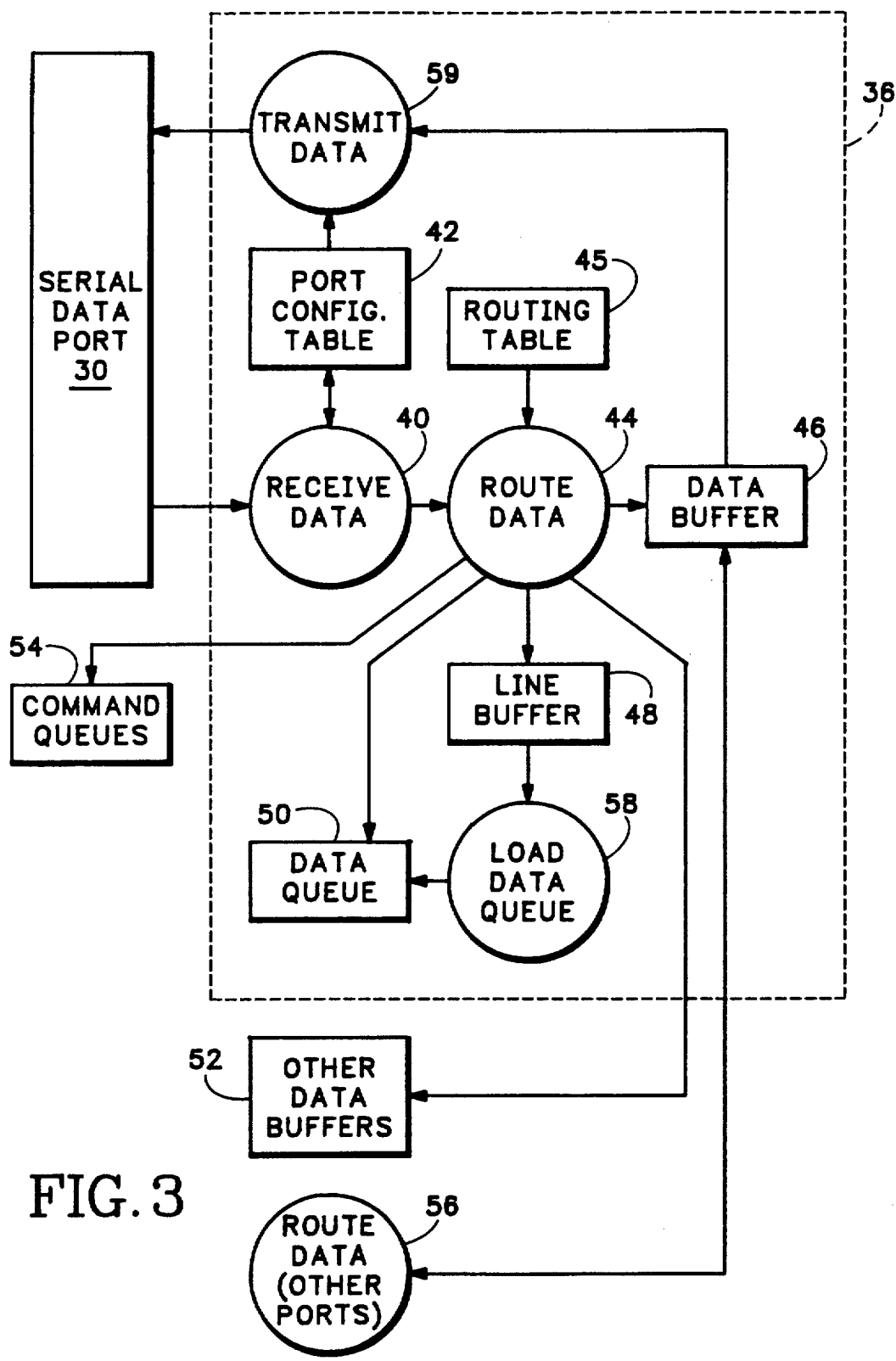
FIG. 3 is a data flow diagram for firmware routines associated with a single serial data port executed by the multiple port data buffer of the present invention.

FIG. 3 is a data flow diagram illustrating interaction between firmware routines and data files stored in memory 24 of FIG. 2, the routines being executed by Processor 22 during buffer operation. The routines and data files shown within the dotted box 36 of FIG. 3 are associated with a single serial data port 30 of FIG. 2, but the data buffer executes and maintains similar routines and data files associated with every other serial data port 30 of FIG. 2. (In FIGS. 3-5 solid boxes represent data files and ellipses represent firmware routines.)

Figures 6, 7:
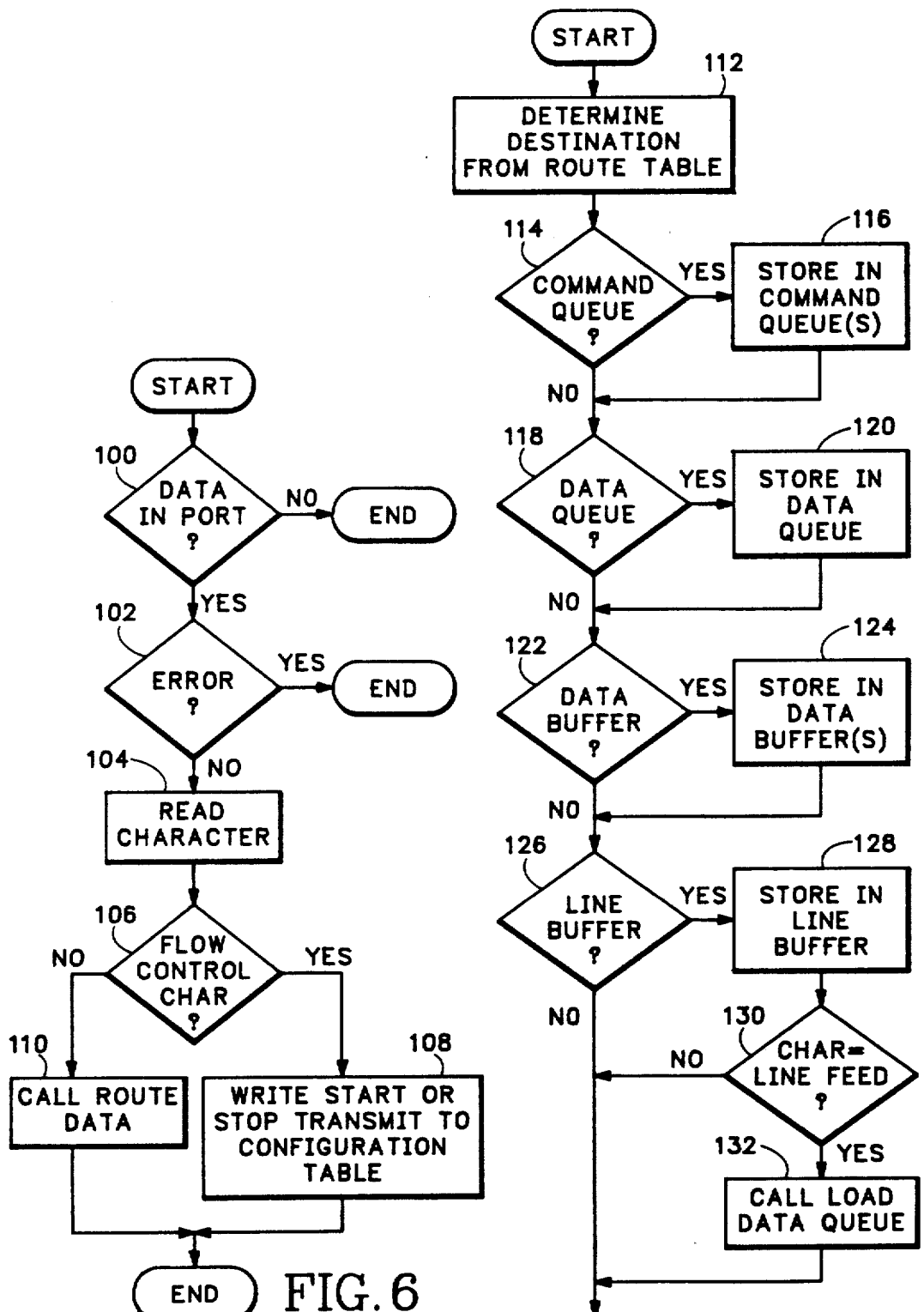
FIG. 6 is a flow chart of the RECEIVE DATA routine of FIG. 3 and 4.
FIG. 7 is a flow chart of the ROUTE DATA routine of FIG. 4.

With reference to FIG. 3, port 30 may be connected to a serial port of an external equipment module for receiving and storing a set of bits representing an output character from the equipment module. FIG. 6 is a flow chart illustrating operation of the RECEIVE DATA routine 40. Referring to both FIGS. 3 and 6, when called a RECEIVE OATA routine 40 checks the serial data port 30 to determine whether the port has received a data character (step 100 of FIG. 6). If not, the routine terminates. However, if the port has received a character, the RECEIVE DATA routine checks a port configuration table 42 maintained in memory 24 of FIG. 2 containing data indicating error checking protocol and determines from error bits also stored in the port 30 whether a data transmission error has occurred (step 102). If so, the routine ignores the incoming data and terminates. Otherwise, the RECEIVE DATA routine reads the character stored in the port 30 (step 104) and determines (at step 106) whether the character is a START or STOP flow control character indicating whether the port in the equipment module is or is not ready to receive data transmission. The RECEIVE DATA routine determines whether the character is a flow control character by consulting the port configuration table 42. If the character is a START or STOP flow control character, the RECEIVE DATA routine writes an appropriate START or STOP indicating word into configuration table 42 and terminates. (As discussed below, this indicating word subsequently controls whether data may be transmitted out of the port). If at step 106 the RECEIVE DATA routine determines the character read out of the port 30 is not a flow control character, it calls a ROUTE DATA routine 44 of FIG. 3, and passes the character to the ROUTE data routine (step 110). After the ROUTE DATA routine 44 terminates, the RECEIVE DATA routine 40 terminates.

A routing table 45 maintained in memory 24 of FIG. 2 stores control data indicating where the ROUTE DATA routine is to store the character. For each of its serial data ports 30, the data buffer maintains data files in memory 24 of FIG. 2 including a data buffer 46, a line buffer 48 and a data queue 50. The DATA BUFFER is a FIFO buffer for storing characters to be sequentially transmitted outward through port 30. The data queue 50 stores incoming characters until the host computer 16 or local terminal 20 of FIG. 1 commands the buffer to read out and return the characters in data queue in a manner described herein below. The line buffer 48 stores each incoming character until an incoming "line feed" character is received. A LOAD DATA QUEUE routine 58 then transfers the character line from the line buffer 48 to the data queue 50. Depending on the control data stored in the routing table 45, the ROUTE DATA routine 44 may store the incoming character in one or more of these buffers or queues or in one or more data buffers 52 associated with other serial data ports for subsequent transmission out of those ports. The ROUTE DATA routine may also store the character in one of two "command queues" for subsequent transmission out of one or both of the command ports 28 of FIG. 2.

FIG. 7 illustrates the ROUTE DATA routine 44 of FIG. 3. With reference to FIGS. 3 and 7, the ROUTE DATA routine initially consults the routing table 45 of FIG. 3 to determine the destination of the character passed thereto by the RECEIVE DATA routine 40 (step 112). If the routing data references one or both command queues 54 (step 114) the ROUTE DATA routine stores the character in the reference command qu(s) (step 116). If the routing data references one or more data buffers 46 or 52, the ROUTE DATA routine stores the character in the appropriate data buffer(s) (step 124). When the routing data indicates that the character is to be stored in line buffer 48 (step 126), the routine stores the character in the line buffer (step 128), checks the character to determine whether it is a line feed character (step 130), and if so calls the LOAD DATA QUEUE routine 58. The LOAD DATA QUEUE routine reads all characters out of the line buffer 48, stores them in DATA QUEUE 50 and then terminates. The ROUTE DATA routine also terminates when at step 130 it determines the character is not a line feed character, or when at step 126 it determines the character is not to be stored in the line buffer.

Referring to FIG. 3, a TRANSMIT DATA routine 59, when called, reads a next character out of data buffer 46 and forwards the character to data port 30 for transmission to an equipment module or printer to which the port is connected. As discussed hereinabove, the ROUTE DATA routine 44 may place incoming characters in the data buffer 46. (This is done, for example, then incoming data is to be echoed back to the sending port.) Similar ROUTE DATA routines 56 associated with other serial data ports of the multiple port buffer may also forward incoming characters to data buffer 46 of this port.

Figure 8:
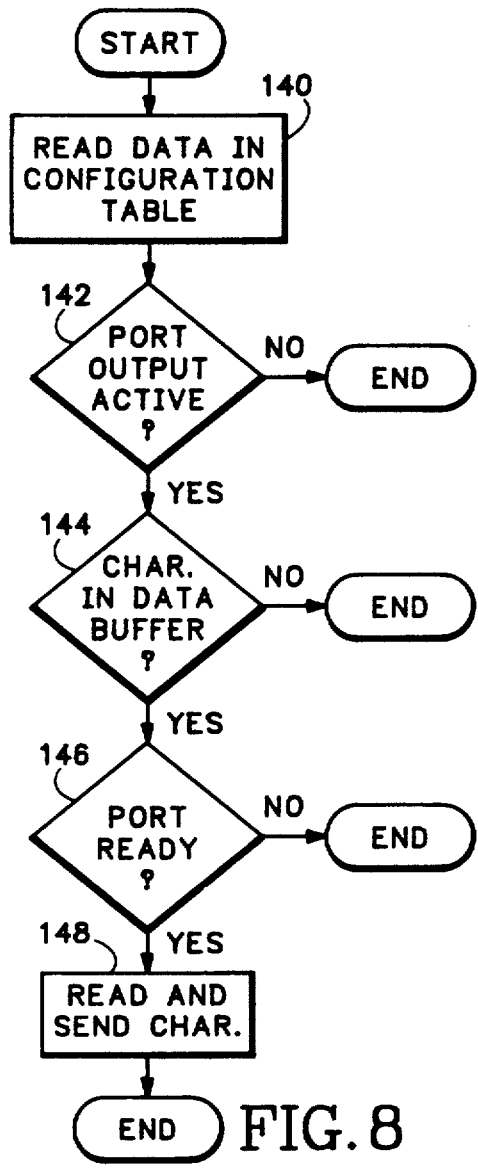
FIG. 8 is a flow chart of the TRANSMIT DATA routine of FIG. 4.

FIG. 8 illustrates details of operation of the TRANSMIT DATA routine 59. This routine initially checks the port configuration table 42 (step 140) and determines whether the port 30 is or is not active, i.e., whether or not the configuration table contains a START or a STOP indicating word (step 142). If the port is not active, the routine ends. If the port is active, the TRANSMIT DATA routine determines whether the data buffer 46 contains a character (step 144) and, if not, the routine terminates. However, if data buffer 46 contains a character, the TRANSMIT DATA routine checks the data port 30 to determine whether the port is ready to transmit a character (step 146). If not, the routine terminates. Otherwise, the TRANSMIT DATA routine reads the character out of the data buffer and sends it to the port for transmission to the remote equipment module (step 148).

Figure 4:
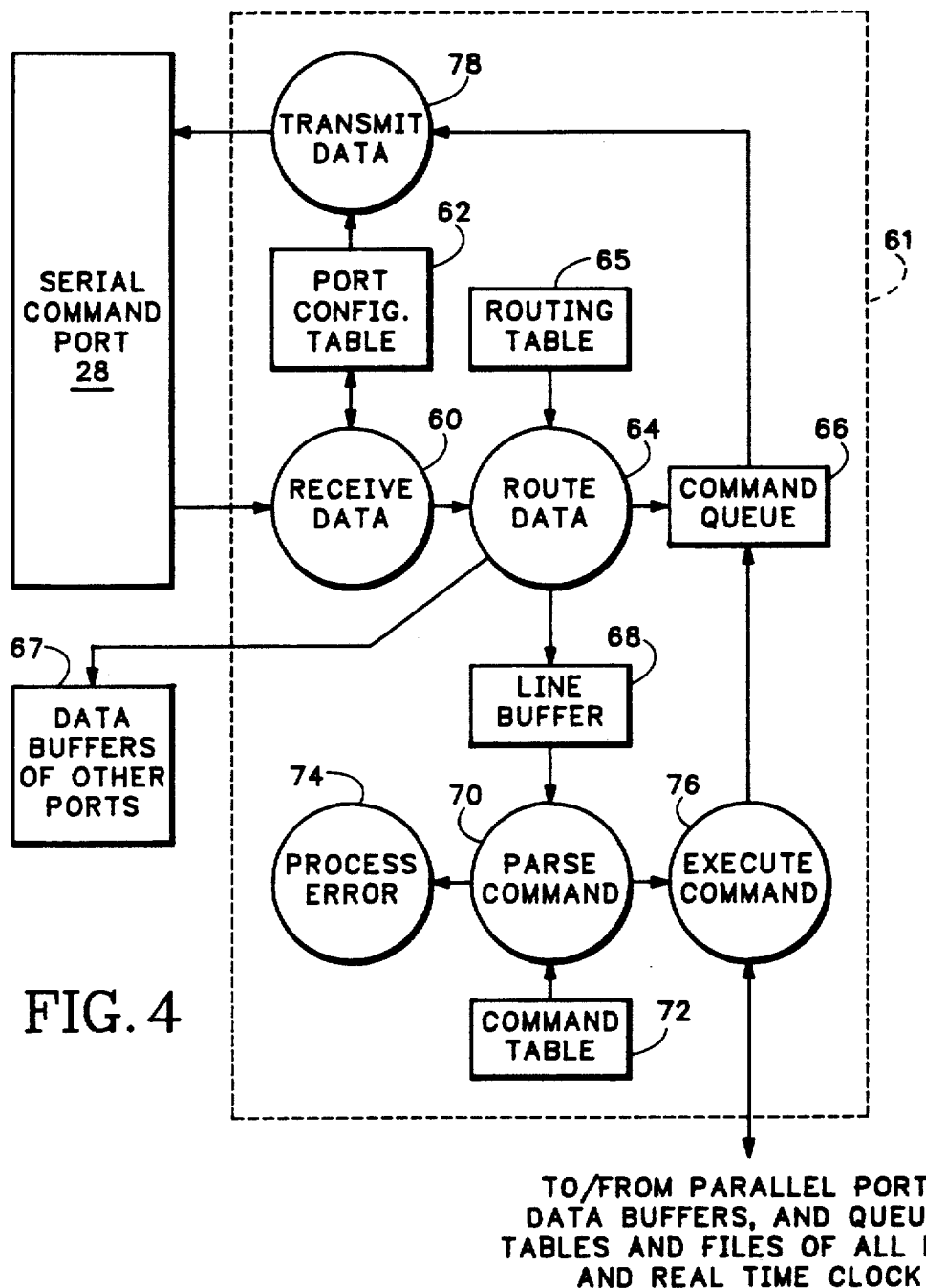
FIG. 4 is data flow diagram for firmware routines associated with a single serial command port executed by the multiple port data buffer of the present invention.

FIG. 4 illustrates data flow between a collection 61 of firmware routines and data files associated with a single serial command Port 28 of FIG. 2. The data buffer also executes and stores similar routines and data files associated with the other command port 28 of FIG. 2. Port 28 may, for example, be connected through network switch 18 to a serial port of the host computer 16 of FIG. 1 for receiving and storing a set of bits representing an output character from the host computer. With reference to FIG. 4, a RECEIVE DATA routine 60, similar to the RECEIVE DATA routine 40 of FIG. 3, checks the serial command port 28 to determine whether the port has received a data character and then reads the character and determines whether it is a START or STOP :low control character. 1: so, the RECEIVE DATA routine writes an appropriate START or STOP indicating word into a configuration table 62 and terminates. Otherwise, the RECEIVE DATA routine calls a ROUTE DATA routine 64 and passes the character to the ROUTE data routine.

A routing table 65 maintained in memory 24 of FIG. 2 stores control data referencing one or more buffers or queues to store the character. For each of its serial command ports 28, the data buffer maintains in memory 24 of FIG. 2 a data command queue 66 and a line buffer 68. The command queue 66 is a FIFO buffer for storing characters to be sequentially transmitted outward through port 28. The line buffer 68 accumulates incoming characters of a command until the port receives an incoming "line feed" character. The command stored in line buffer 68 may then be executed.

Figure 9:
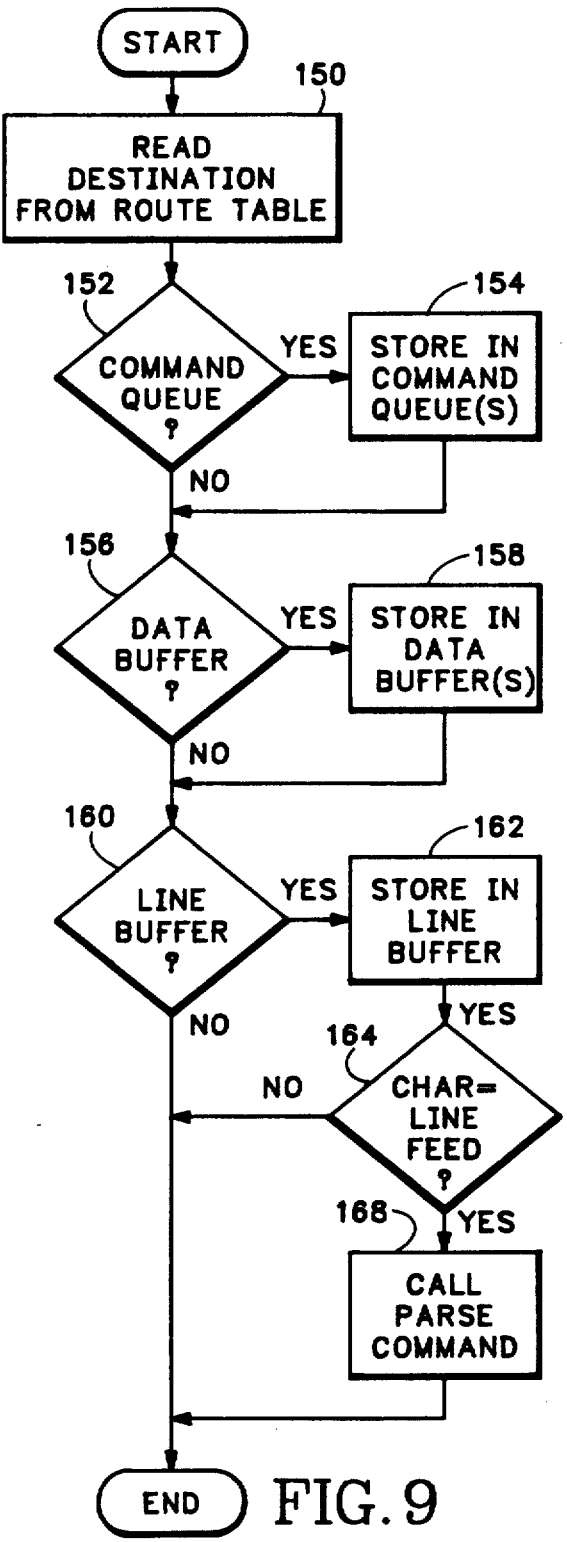
FIG. 9 is a flow chart of the ROUTE DATA routine of FIG. 4.

FIG. 9 illustrates the ROUTE DATA routine 64 of FIG. 4. With reference to FIGS. 4 and 9, the ROUTE DATA routine initially consults the routing table 65 of FIG. 4 to determine the destination of the character passed thereto by the RECEIVE DATA routine 60 (step 150). If the routing data references the command queue 66 (step 152) the ROUTE DATA routine stores the character in the command queue (step 154). If the routing data references a data buffer 67 of one or more serial data ports (step 156), the routine stores the character in the appropriate data buffer(s) (step 158). When the routing data indicates that the character is to be stored in line buffer 68 (step 160), the routine stores the character in the line buffer (step 162), checks the character to determine whether it is a line feed character (step 164), and if so calls a PARSE COMMAND routine 70 of FIG. 4 (step 168) and terminates. The ROUTE DATA routine 64 also terminates when at step 164 it determines the character is not a line feed character, or when a: step 160 it determines the character is not to be stored in the line buffer.

Figure 10:
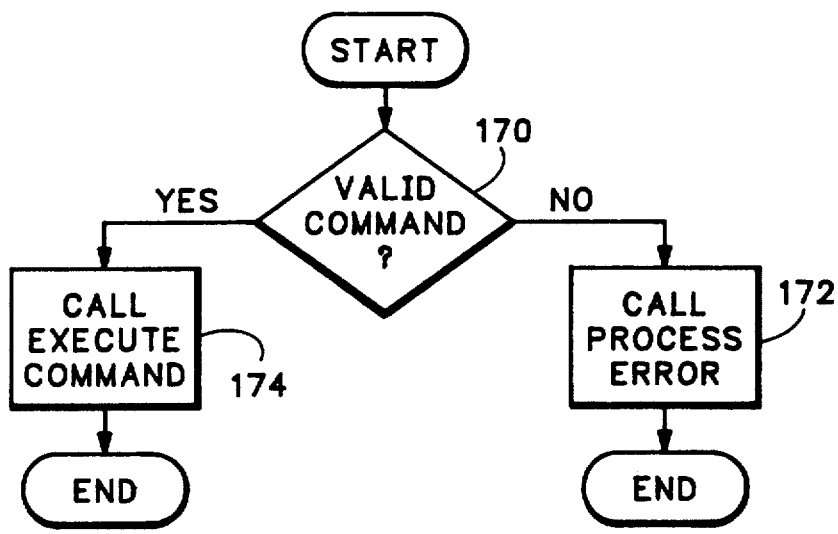
FIG. 10 is a flow chart of the EXECUTE COMMAND routine of FIG. 3.

FIG. 10 illustrates operation of the PARSE COMMAND routine 70. When called, the PARSE COMMAND reads a command out of the line buffer 68 and determines from a command table 72 whether the command is valid (step 170). If not, the PARSE COMMAND calls a PROCESS ERROR routine 74 of FIG. 4 (step 172) and thereafter terminates. (The PROCESS ERROR routine simply transmits an error message back to the host computer). If the command is valid, the PARSE COMMAND routine 70 calls an appropriate EXECUTE COMMAND routine 76 (step 174) to execute the command. The PARSE COMMAND routine then terminates. The EXECUTE COMMAND routine executes a variety of commands described in more detail herein below, altering data stored in the various tables of all ports, transferring data from data queues to data buffers, reading selected data stored in the various tables and files utilized by the various ports, returning the data to command queue 66, setting and reading out time and date output of the real time clock, and setting states of output signals of the parallel data ports 32 of FIG. 2.

A TRANSMIT DATA routine 78, when called, reads a next character out of command queue 66 and forwards the character to command port 28 for transmission to the host computer. The TRANSMIT DATA routine 78 operates in a manner similar to the TRANSMIT DATA routine 59 of FIG. 3.

Figure 5:
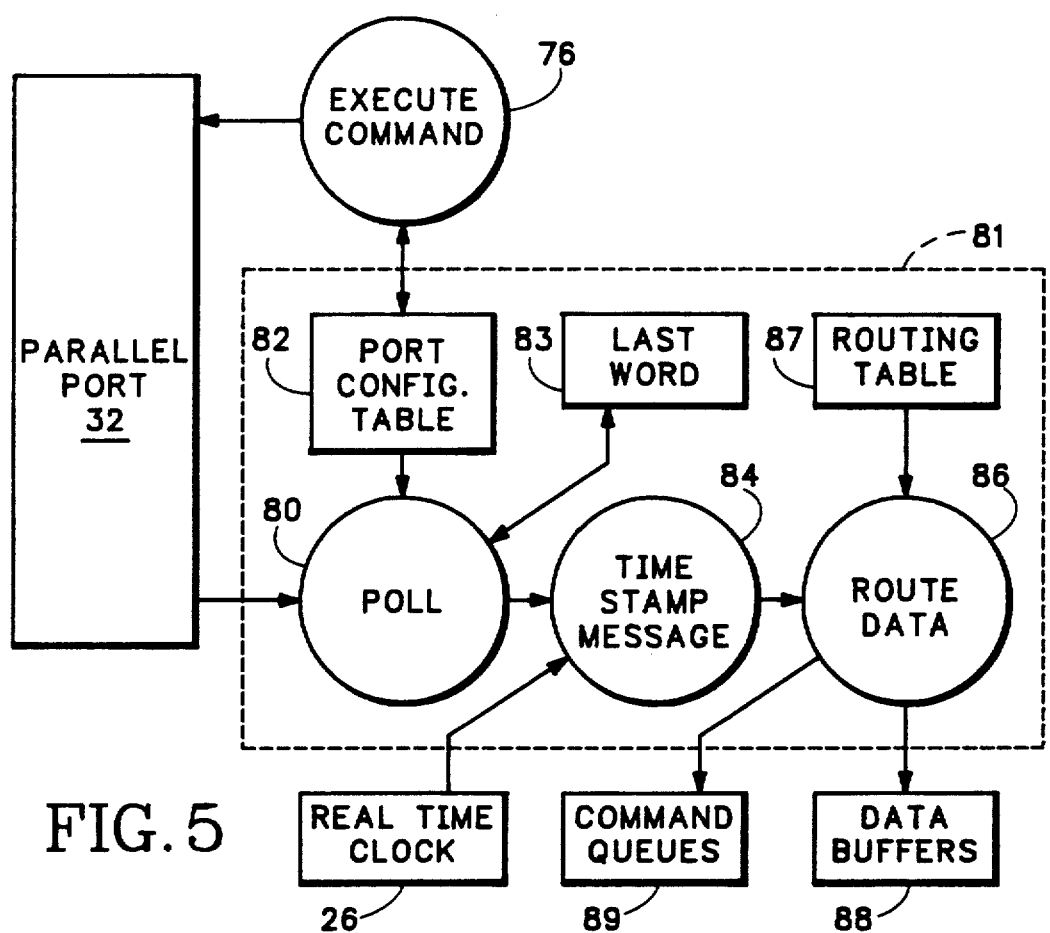
FIG. 5 is a data flow diagram for firmware routines associated with a single parallel data port executed by the multiple port data buffer of the present invention.

FIG. 5 illustrates data flow between a collection 81 of firmware routines and data files associated with a single parallel data port 32 of FIG. 2. The data buffer executes and stores similar routines and data files for the other parallel data ports 32 FIG. 2. Port 32 receives and stores up to eight parallel data bits from a remote equipment module. A POLL routine 80 periodically reads the 8-bit data word stored in port 32 and compares it with a previously read data word stored in a LAST WORD file 83. If states of one or more bits of the two words differ, the POLL routine stores the last read word in the LAST WORD file and consults an entry in a port configuration table 82 associated with each bit that changed state to determine if a message is to be sent indicating the bit has changed state. If so, the POLL routine 80 calls a TIME STAMP ZO MESSAGE routine 81. The TIME STAMP MESSAGE routine reads the current date and time output of the real time clock 26 of FIG. 2 and adds to it data referencing the port and the particular bit that changed state, and its state. The TIME STAMP MESSAGE routine sends each character of the resulting message to a ROUTE DATA routine 86 which determines from data stored in a routing table 87 where the message is to be forwarded. The ROUTE DATA routine may forward the message to the data buffers 88 of any of the six serial data ports for further transmission to a printer or other device connected to the serial port, and/or may forward the message to command queues of either of the two serial command ports for further transmission to the host computer or local terminal.

Each parallel port 32 may alternatively control up to eight binary output signals. As discussed hereinbelow, the state of each output signal is set by the EXECUTE COMMAND routine 76 of FIG. 4 in response to commands from the host computer or local terminal. The EXECUTE COMMAND routine 76 of FIG. 4 executes the following commands received from the host computer or from the local terminal by way of either serial command port:

SET DATE = <MM-DD-YY>

This command indicates a month (MM), day (DD) and year (YY) and tells the EXECUTE COMMAND routine to set the current date of the real time clock 26 of FIG. 2 accordingly.

SET TIME = <HH:MM:SS>

This command indicates an hour (HH), minute (MM) and second (SS) and tells the EXECUTE COMMAND routine to set the current time of the real time clock 26 of FIG. 2 accordingly.

SET <port> <n>BAUD = <baud rate>

This command tells the EXECUTE COMMAND routine to set the baud rate of the nth serial data port (port =DP) or the nth control port (port =CP) to an indicated baud rate and to set data in the configuration table of the port accordingly.

SET <port> <n>CONTROL = <mode>

This command tells the EXECUTE COMMAND routine to set the control mode of a serial port to an indicated flow control mode; "EIA"/, "XON", "BOTH" or "NONE" and to set data in the configuration table of the port accordingly.

SET <port> <n>PARITY = <type>

This command tells the EXECUTE COMMAND routine to set the clarity checking mode of a particular serial port to an indicated type (even, odd or none) and to set data in the configuration table of the port accordingly.

SET <port> <n>STOP = <number>

This command tells the EXECUTE COMMAND routine to set a particular serial port for an indicated number of STOP bits and to set data in the configuration table of the port accordingly.

SET PP <n>MODE = <mode>

This command tells the EXECUTE COMMAND routine to set the nth parallel port for operation as an input port (mode =input) or an output port (mode =output) and to place mode indicating data in the port's configuration table.

SET ROUTE <input port> <n>to <output port> <buffer > <member >

For each possible destination buffer or queue that may receive a character from a serial port, the routing table associated with the serial port contains a separate bit of state indicating whether the character is to be routed to the buffer or queue. This command tells the EXECUTE COMMAND routine to toggle the state of a particular data bit in the routing table of the nth serial data port (input port =DP) or the nth control port (port =CP). The <output port>and <number>fields indicate the port type DP or CP and number of the port buffer or queue associated with the bit to be toggled. The <buffer>field indicates the particular buffer or queue (LB for line buffer, DB for data buffer, DQ for data queue or CP for command queue).

SET COS PORT <n>BIT <m><state>

This command tells the EXECUTE COMMAND routine to set a word m in the configuration of table the nth parallel port to indicate a particular state (HIGH, LOW, or NONE). If the bit is high, the POLL routine initiates a message whenever the mth bit of the input data word goes high. If the word is LOW, the POLL routine initiates a message whenever the mth bit of the ports 8-bit input data word goes low. Otherwise, if the mth word is NONE, the POLL routine ignores state changes in the mth bit of the port's input data word.

DISPLAY DATE

This command tells the EXECUTE COMMAND routine to read the current date of the real time clock 26 of FIG. 2 and place a string indicating the current data in the command queue of the command port initiating the command so that the string is sent back to the host computer or local terminal that sent the command.

DISPLAY TIME

This command tells the EXECUTE COMMAND routine to read the current time of the real time clock 26 of FIG. 2 and to place a string indicating that time in the command queue for transmission back to the host computer or local terminal that sent the command.

DISPLAY <port> <n>

This command tells the EXECUTE COMMAND routine to read out the baud rate, control, parity and stop bit data indicated by the configuration table of the nth serial data port (port =DP) or the nth control port (port =CP) and to place the data in the command queue for transmission back to the host computer or local terminal that sent the command.

DISPLAY <port> <n>BAUD

This command tells the EXECUTE COMMAND routine to read out the baud rate indicated by the configuration table of the nth serial data port (port =DP) or the nth control port (port =CP) and to place a string indicating the third rate in the command queue for transmission back to the host computer or local terminal that sent the command.

DISPLAY <port> <n>CONTROL

This command tells the EXECUTE COMMAND routine to read out the flow control mode indicated in the configuration table of a serial port and to place a string indicating the control mode in the command queue for transmission back to the host computer or local terminal that sent the command.

DISPLAY <port> <n>PARITY

This command tells the EXECUTE COMMAND routine to read out the parity checking mode indicated in the configuration table of a particular serial port and to place a string indicating the parity checking mode in the command queue for transmission back to the host computer or local terminal that sent the command.

DISPLAY <port> <n>STOP

This command tells the EXECUTE COMMAND routine to read out the number of STOP bits indicated in the configuration table of a particular serial port and to place a string indicating the number of STOP bits in the command queue for transmission back to the host computer or local terminal that sent the command.

DISPLAY PP <n>MODE

This command tells the EXECUTE COMMAND routine to read out the input or output mode indicated in the configuration table of the nth parallel port and to place a string indicating the mode in the command queue for transmission back to the host computer or local terminal that sent the command.

DISPLAY ROUTE <input port> <n>

This command tells the EXECUTE COMMAND routine to read the routing data out of the routing table of the nth serial data port (input port =DP) or the nth control port (port =CP) and to place the routing data in the command queue for transmission back to the host computer or local terminal that sent the command.

DISPLAY COS

This command tells the EXECUTE COMMAND routine to read data in the configuration table of each parallel port indicating whether the port is currently an input port or an output port and to place a string indicating the mode of each port in the command queue for transmission back to the host computer or local terminal that sent the command.

DISPLAY COS PORT <n>

This command tells the EXECUTE COMMAND routine to read the LAST WORD data for the nth parallel port and to place the word in the command queue for transmission back to the host computer or local terminal that sent the command.

DISPLAY COS PORT <n>BIT <m>

This command tells the EXECUTE COMMAND routine to read data in the configuration table of PORT <n> indicating the port is to send a message when bit m goes high or low or is to ignore bit m, and to place the data in the command queue for transmission back to the host computer or local terminal that sent the command.

DUMP DB <n>

This command tells the EXECUTE COMMAND routine to transfer the contents of the data queue of the nth serial data port to the command queue of a serial command port for transmission back to the host computer or local terminal that sent the command.

CLEAR DB <n>

This command tells the EXECUTE COMMAND routine to clear the contents of the data queue of the nth serial data port.

OUTPUT DB <n> = <string>

This command tells the EXECUTE COMMAND routine to transfer the <string> field to the data buffer of the nth serial data port for transmission to the device connected to the port.

OUTPUT PP <n>BIT <m> = <state>

This command tells the EXECUTE COMMAND routine to set the state of output bit m of the nth parallel data port to a particular state (ON or OFF).

PUT PP <n>BIT <m>

This command tells the EXECUTE COMMAND routine to read the state of bit m of the LAST WORD file of the nth parallel data port and to place a string indicating the bit state in a command queue of a serial command port for transmission back to the host computer or local terminal that sent the command.

TASK <x>SCRIPT = <string>

This command tells the EXECUTE COMMAND routine to store the <string>field in an entry x of a string file, the string field indicating a command. The command indicated by the <string> field may be any command listed hereinabove.

TASK <x> SCRIPT

This command tells the EXECUTE COMMAND routine to read a command stored in entry x of the string file and to place the command in a command queue of a serial command port for transmission back to the host computer or local terminal that sent the command.

TASK <x> INTERVAL <n>

This command tells the EXECUTE COMMAND routine to read and execute a command stored in entry x of the string file every n seconds.

The data buffer stores a separate subroutine for each command and the EXECUTE COMMAND routine calls the appropriate subroutine to execute each command. These commands require the data buffer to read data out of one file, memory or port address and write the data into another file, memory or port address. Since such operations are well-known to those skilled in the art, subroutines for executing these commands are not further detailed herein.

Figure 11:
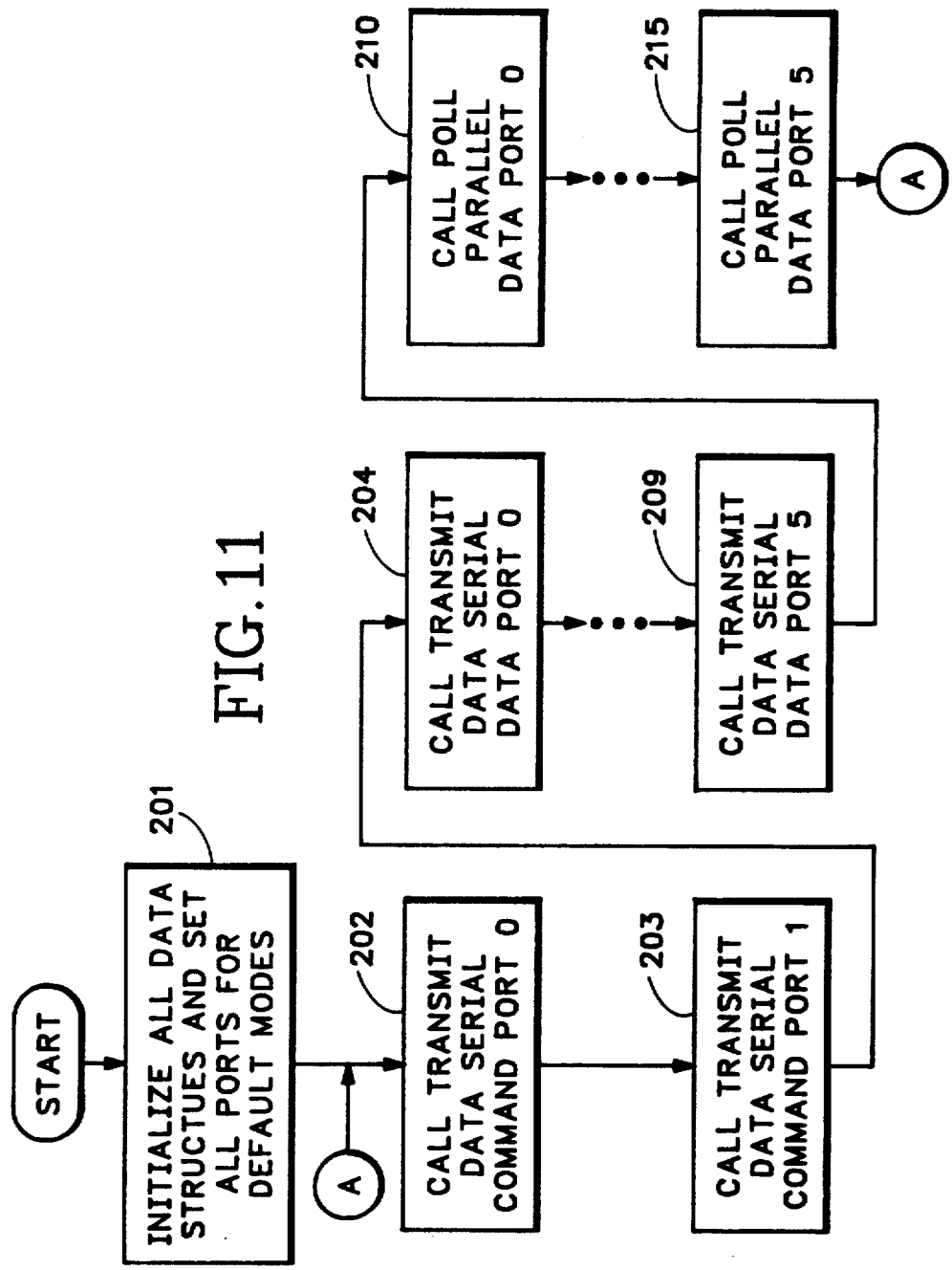
FIG. 11 is a flow chart illustrating a main program controlling operation of the data buffer.

FIG. 11 is a flow chart illustrating a main program executed by the data buffer. Starting at step 201, the main program initializes and stores default data values in all data structures utilized by the various routines. The main program also sets all ports for default baud rates, parity and other modes of operation. The main program then calls the TRANSMIT DATA routine for serial command port 0 (step 202), and on return of that TRANSMIT DATA routine, the main program calls TRANSMIT DATA routine for serial command port 1 (step 203). The main program then successively calls the TRANSMIT DATA routines for all six serial data ports 0 through 5 (steps 204-209). Finally, the main program successively calls the POLL routines for parallel ports 0 through 5 (steps 210-215). On return of the last POLL routine, the main program returns to step 202 and continues to call each routine in succession. With reference to FIG. 2, each serial command port 28 or serial data port 30 transmits an interrupt signal to microprocessor 22 whenever the port has received data from an external module or from the host computer. In response to an interrupt signal, the microprocessor 22 suspends operation of the main program of FIG. 11, executes the appropriate RECEIVE DATA routine and any routine called thereby, and then resumes executing the main program.

A data buffer has been described which includes multiple parallel and serial data ports connected to equipment modules and serial control ports connected to a host computer and a local terminal. The data buffer receives and stores output data from the equipment modules via the data ports, and transmits the stored input data to the host computer or local terminal via control ports selectively either as received or in response to commands from the host computer or local terminal. Since the buffer stores output data from the equipment modules as the data is produced, the host computer need not rapidly poll the various equipment modules to avoid missing the output data. The buffer adjusts each data port to use the data transmission protocol employed by the equipment module to which it is connected and selectively routes data received by one data port outward on one or more other data or control ports or stores incoming data for later transmission via a selected port in response to an input command. The host computer or local terminal may also command the buffer to periodically transmit a selected data string outward on one or more designated data ports. thereby to periodically command an equipment module to carry out some action. The data buffer further includes a real time clock producing data indicating current time and date. and when the data buffer detects a state change in an input bit at a parallel port, it generates an indicating message including the bit state along with the current time and date and transmits the message output on a selected control port.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A data buffer for interfacing a plurality of equipment modules to a data processing apparatus, each equipment module including a module data port for producing output data and receiving input data utilizing a present data transfer mode, the data buffer comprising:

a plurality of buffer data ports, each buffer data port being connected to a separate one of said module data ports for transmitting data thereto and receiving data therefrom, each buffer data port utilizing one of a plurality of differing data transfer modes, the one utilized corresponding to the present data transfer mode of the module data port to which hit is connected;

a control port for receiving commands from the data processing apparatus and for transmitting data to the data processing apparatus;

means for selecting the one data transfer mode utilized by each buffer data port in response to mode selection input commands transmitted from the data processing apparatus to the control port;

a real time clock circuit producing output data indicating a time; and means for transferring data between a selected one of the buffer data and control ports to another one of the buffer data and control ports upon command from the data processing apparatus, the transferring means including means for detecting a state change in a bit of data received by one of said buffer data ports, for thereupon generating message data including the time indicated by the output data of said real time clock circuit, and for routing the message data to said control port for transmission to the data processing apparatus.

2. The data buffer in accordance with claim 1 wherein the transferring means further comprises means for routing data received by one buffer data port for transmission to a selected one of said buffer data and control ports, the one port being selected in response to a routing input command transmitted from the data processing apparatus to the control port.

3. The data buffer in accordance with claim 1 wherein the transferring means further comprises means for routing data received by one buffer data port for transmission to a selected set of more than one of said buffer data and control ports, the more than one ports being selected in response to a routing input command transmitted from the data processing apparatus to the control port.

4. The data buffer in accordance with claim 1 wherein the transferring means further comprises means for storing data received by one buffer data port and then, in response to a dump input command from the data processing apparatus, routing the stored data to the control port for transmission to the data processing apparatus.

5. The data buffer in accordance with claim 1 wherein the transferring means further comprises means for selectively either routing data received by one buffer data port for transmission to one of said buffer data and control ports, or storing the data received and then, in response to a dump input command from the data processing apparatus, routing the stored data to the control port for transmission to the data processing apparatus, selection of routing or storing being determined by a selection input command from the data processing apparatus to the control port.

6. The data buffer in accordance with claim 1 wherein the transferring means further comprises:

means for storing a data string in response to a first input command conveying said data string from said data processing apparatus to the control port; and means for periodically routing the stored data string for transmission via one of said buffer data ports to the corresponding one of said module data ports in response to a second input command from said data processing apparatus to the control port, the second input command indicating an interval between successive transmissions.

7. The data buffer in accordance with claims 2, 3, 4, 5 or 6, wherein the routing means comprises a routing table for each buffer data port containing a destination parameter as provided by the data processing apparatus via the control port that indicates the selected one or more of said buffer data and control ports to which the data from that buffer data port is to be transmitted.

8. The data buffer in accordance with claim 1 wherein the plurality of buffer data ports comprise:
- a plurality of serial buffer data ports for transmitting and receiving serial data; and
- a plurality of parallel buffer data ports for transmitting and receiving parallel data.

9. The data buffer in accordance with claim 1 wherein the selecting means comprises a configuration table having an entry for each buffer data port, the entry containing data transfer mode parameters as provided by the data processing apparatus via the control port for configuring the data transfer mode for each buffer data port to correspond to the module data port to which it is coupled.

10. A data buffer for interfacing a plurality of equipment modules to a data processing apparatus, each equipment module including a module data port for producing output data and receiving input data, the data buffer comprising:
- a plurality of buffer data ports, each buffer data port being connected to a separate one of said module data ports for transmitting data thereto and receiving data therefrom;
- a control port for receiving commands from the data processing apparatus and for transmitting data to the data processing apparatus;
- means for selectively routing data received by one buffer data port for transmission to one of said buffer data and control ports, or for storing the data received by said one buffer data port and then, in response to a dump input command from the data processing apparatus, routing the stored data to the control port for transmission to the data processing apparatus, selection of routing or storing being determined by a selection input command transmitted by the data processing apparatus to the control port;
- a real time clock producing output data indicating a time; and
- means for detecting a state change in a bit of data received by one of said buffer data ports, for generating message data including a reference to the time indicated by said real time clock in response to the state change, and for routing the message data to said control port for transmission to the data processing means.

11. The data buffer in accordance with claim 10 further comprising:
- means for storing a data string in response to a first input command conveying said data string from said data processing apparatus to the control port; and
- means, responsive to a second input command from said data processing apparatus to the control port, for periodically passing the stored data string for transmission via one of said buffer data ports to the corresponding one of said module data ports, the second input command indicating an interval between successive transmissions.

12. The data buffer in accordance with claim 10 wherein the plurality of buffer data ports comprise:
- a plurality of serial buffer data ports for transmitting and receiving serial data; and
- a plurality of parallel buffer data posts for transmitting and receiving parallel data.

13. The data buffer in accordance with claim 10 wherein the routing means comprises a routing table for each buffer data port containing a destination parameter as provided by the data processing apparatus via the control port that indicates the selected one or more of said buffer data and control ports to which the data from that buffer data port is to be transmitted.

* * * * *

UNITED STATES PATENT AND TRADEMARK OFFICE
CERTIFICATE OF CORRECTION

PATENT NO. : 5,214,760

DATED : May 25, 1993

INVENTOR(S) : John A. Hammond and Thomas M. Cooper

It is certified that error appears in the above-identified patent and that said Letters Patent is hereby corrected as shown below:

Column 11,
    Claim 1, line 64 - replace "hit" with "it"

Signed and Sealed this

Eighteenth Day of January, 1994

Attest:

BRUCE LEHMAN

Attesting Officer      Commissioner of Patents and Trademarks